(12) United States Patent
Gomi et al.

(10) Patent No.: US 12,184,644 B2
(45) Date of Patent: Dec. 31, 2024

(54) INFORMATION PROCESSING DEVICE, INFORMATION PROCESSING METHOD, AND NON-TRANSITORY COMPUTER READABLE STORAGE MEDIUM

(71) Applicant: Yahoo Japan Corporation, Tokyo (JP)

(72) Inventors: Hidehito Gomi, Tokyo (JP); Wataru Oogami, Tokyo (JP)

(73) Assignee: Yahoo Japan Corporation, Tokyo (JP)

( * ) Notice: Subject to any disclaimer, the term of this patent is extended or adjusted under 35 U.S.C. 154(b) by 176 days.

(21) Appl. No.: 17/689,891

(22) Filed: Mar. 8, 2022

(65) Prior Publication Data
US 2022/0337584 A1 Oct. 20, 2022

(30) Foreign Application Priority Data
Apr. 19, 2021 (JP) ................. 2021-070648

(51) Int. Cl.
H04L 9/40 (2022.01)
(52) U.S. Cl.
CPC ...... H04L 63/0861 (2013.01); H04L 63/0442 (2013.01)
(58) Field of Classification Search
CPC ....... H04L 63/06; H04L 63/062; H04L 63/08; H04L 63/0861
See application file for complete search history.

(56) References Cited

U.S. PATENT DOCUMENTS

2021/0075784 A1* 3/2021 Yasaki .................. H04L 63/18
2021/0194703 A1* 6/2021 Queralt ............... H04L 63/0815

FOREIGN PATENT DOCUMENTS

JP 2015-230520 A 12/2015

OTHER PUBLICATIONS

Baghdasaryan et al., "FIDO UAF Protocol Specification—FIDO Alliance Proposed Standard Oct. 20, 2020" (fido-uaf-v1.2-ps-20201020), FIDO Alliance (Year: 2020).*
Machani et al., "FIDO UAF Architectural Overview" (v1.2-ps-20201020), FIDO Alliance (Year: 2020).*

* cited by examiner

*Primary Examiner* — Boris D Grijalva Lobos
(74) *Attorney, Agent, or Firm* — Procopio, Cory, Hargreaves & Savitch LLP

(57) ABSTRACT

An information processing device according to the present application includes a control unit. The control unit acquires, from an authentication server, a generation request of a key pair for FIDO authentication transmitted from a user terminal including an authenticator for the FIDO authentication to the authentication server, generates a generation instruction for causing the authenticator to generate the key pair based on the generation request, and notifies the authenticator of the generation instruction via the authentication server.

6 Claims, 12 Drawing Sheets

FIG.6

| LINK ID | AUTHENTICATION SERVER | USER ID | PUBLIC KEY |
|---|---|---|---|
| Co1 | AUTHENTICATION SERVER A | U01 | PublicKey1 |
| Co2 | AUTHENTICATION SERVER A | U02 | PublicKey2 |
| Co3 | AUTHENTICATION SERVER B | U03 | PublicKey3 |
| Co4 | AUTHENTICATION SERVER C | U01 | PublicKey4 |
| ... | ... | ... | ... |

FIG.7

| USER ID | LINK ID | ATTRIBUTE INFORMATION | AUTHENTICATION MEANS |
|---|---|---|---|
| U01 | Co1 | ATTRIBUTE #1 | AUTHENTICATION MEANS #1 |
| ... | ... | ... | ... |

FIG.8

| SERVICE | AUTHENTICATION SERVER | PRIVATE KEY |
|---|---|---|
| SERVICE A | AUTHENTICATION SERVER A | PrivateKey1 |
| SERVICE C | AUTHENTICATION SERVER C | PrivateKey2 |
| ... | ... | ... |

INFORMATION PROCESSING DEVICE, INFORMATION PROCESSING METHOD, AND NON-TRANSITORY COMPUTER READABLE STORAGE MEDIUM

CROSS-REFERENCE TO RELATED APPLICATIONS

The present application claims priority to and incorporates by reference the entire contents of Japanese Patent Application No. 2021-070648 filed in Japan on Apr. 19, 2021.

BACKGROUND OF THE INVENTION

1. Field of the Invention

The present invention relates to an information processing device, an information processing method, and an information processing program.

2. Description of the Related Art

In recent years, a technique for facilitating authentication of a user has been proposed. For example, an authentication technique called FIDO (registered trademark) has been proposed.

However, there is room for improvement in easily introducing the FIDO-based authentication technique. Specifically, when the FIDO-based authentication technique is introduced, it is necessary to add a function corresponding to FIDO to the authentication server or to modify the authentication server, which may be a barrier to the introduction of FIDO.

SUMMARY OF THE INVENTION

An information processing device according to the present application includes a control unit. The control unit acquires, from an authentication server, a generation request of a key pair for FIDO authentication transmitted from a user terminal including an authenticator for the FIDO authentication to the authentication server, generates a generation instruction for causing the authenticator to generate the key pair based on the generation request, and notifies the authenticator of the generation instruction via the authentication server.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a diagram illustrating an example of public key information according to the embodiment;

FIG. 7 is a diagram illustrating an example of user information according to the embodiment;

FIG. 8 is a diagram illustrating an example of private key information according to the embodiment;

DETAILED DESCRIPTION OF THE PREFERRED EMBODIMENTS

Figure 1:
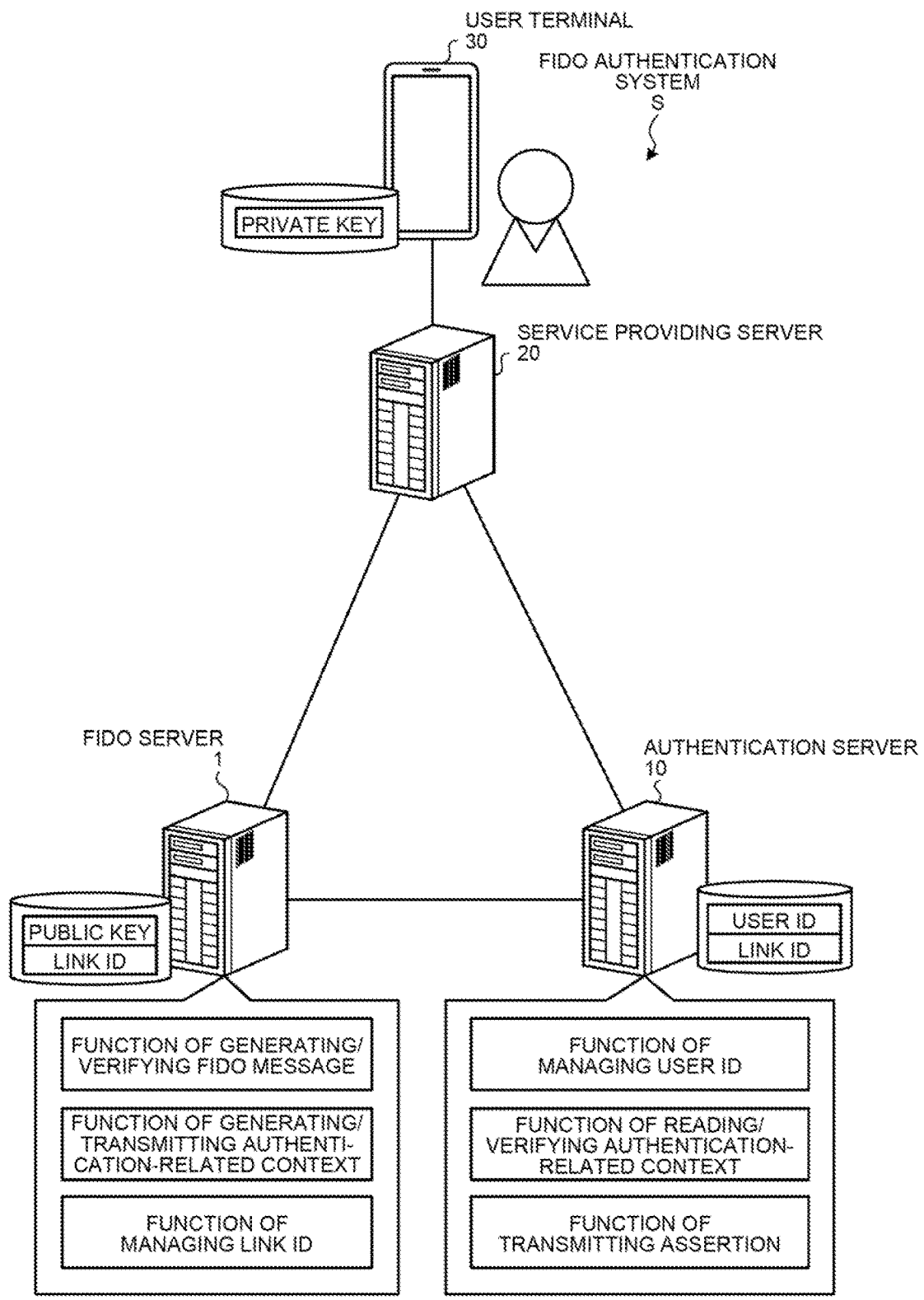
FIG. 1 is a diagram illustrating a configuration example of an authentication system according to an embodiment.

Hereinafter, a mode for implementing an information processing device, an information processing method, and an information processing program (hereinafter described as an "embodiment") according to the present application will be described in detail with reference to the drawings. Note that the information processing device, the information processing method, and the information processing program according to the present application are not limited by the embodiment. In the following embodiments, like reference numerals denote like elements, and redundant descriptions are omitted.

Embodiment

Various services on the Internet typically employ remote authentication using a password and an identifier (ID). In remote authentication, a password and an ID are transmitted from a client device to an authentication server via a network such as the Internet. For example, when a user logs in to a service, the user inputs the password and ID. Then, the authentication server verifies whether the received password is an appropriate password associated with the ID stored in the authentication server.

One of the problems related to remote authentication is that the user reuses one password among a plurality of services. The user generally has a plurality of accounts for a plurality of services such as an email, a social networking service (SNS), an online video platform, online shopping, and online banking. When the user sets a different password for each service, it may be difficult for the user to memorize a plurality of different passwords for each service. Therefore, the user may set a common password for a plurality of services. However, if one of the plurality of services leaks a password, a malicious person may use the password to gain unauthorized access to another of the plurality of services.

In order to solve the problem related to remote authentication as described above, an authentication technique called FIDO has been proposed. In the authentication form of FIDO, the identity of the user is verified by an authenticator built in or externally attached to a user device such as a smartphone. An example of the authenticator is a biometric authentication function of the smartphone. Thus, FIDO authentication employs local authentication.

In local authentication, the authenticator electronically signs an identity verification result by using a private key stored in the authenticator. Then, the electronically-signed verification result is transmitted from the user device to a service on the Internet. The service on the Internet can check the validity of the electronically-signed verification result transmitted from the user device by using a public key registered in the service.

As described above, FIDO authentication enables password-less authentication using the authenticator built in or externally attached to the user device. For example, the user can execute password-less login in a service adopting FIDO authentication by inputting biometric information such as a fingerprint to the smartphone. Since FIDO authentication allows the user to log in to the service without using a password, FIDO authentication is preferable from the viewpoint of convenience and safety.

However, when service providers intend to introduce FIDO authentication, they need to add a function corresponding to FIDO authentication to the authentication server or modify the authentication server. In this case, the service providers need to temporarily stop the provision of the service or receive a certification regarding the normal operation of FIDO authentication. This may be a barrier to the introduction of FIDO.

Therefore, in the present disclosure, a FIDO server having a function for performing FIDO authentication is arranged separately from the authentication server such that the authentication server can call the function for FIDO authentication from the FIDO server.

FIG. 1 is a diagram illustrating a configuration example of an authentication system S according to an embodiment. As illustrated in FIG. 1, the authentication system S according to the embodiment includes a FIDO server 1, an authentication server 10, a service providing server 20, and a user terminal 30. The FIDO server 1, the authentication server 10, the service providing server 20, and the user terminal 30 are connected to a network (not illustrated) in a wired or wireless manner. The network is, for example, a network such as the Internet, a wide area network (WAN), or a local area network (LAN). The components of the authentication system S can communicate with each other via the network. An operation example of the components of the authentication system S will be described later in detail with reference to FIG. 9 and subsequent drawings.

The user terminal 30 is a terminal device handled by a user who intends to receive a service. For the user terminal 30, any type of terminal device such as a smartphone, a desktop PC, a notebook PC, or a tablet PC may be used.

In addition, the user terminal 30 can use the service provided by the service providing server 20 by accessing the service providing server 20. In the present disclosure, registration and authentication of the user for receiving the service are performed in FIDO authentication. Note that the registration processing and the authentication processing will be described later in detail with reference to FIG. 9 and subsequent drawings.

In addition, the user terminal 30 includes an authenticator for FIDO authentication. The authenticator has, for example, a function for performing biometric authentication of the user. Biometric authentication is performed by detecting biometric information such as a fingerprint, an iris, and a face. Note that the authenticator is not limited to being built in the user terminal 30, and may be externally attached to the user terminal 30 with a universal serial bus (USB) key or the like. In addition, the authenticator stores a private key for electronically signing the verification result of the identity of the user. The private key is generated by the authenticator as a key pair together with the public key to be described later.

The service providing server 20 is a server that provides various services. The service provided by the service providing server 20 includes, for example, a browser, Internet shopping, an e-commerce service such as an electronic shopping street, and the like.

When the user terminal 30 requests an access to the service, the service providing server 20 requests the authentication server 10 to authenticate the user, and when the user is authenticated by the authentication server 10, the service providing server approves the access to the service by the user terminal 30.

The authentication server 10 is a server that authenticates the identity of the user who has requested access to the service. The authentication server 10 implements the registration processing and authentication processing for FIDO authentication by using the function of the FIDO server 1. Specifically, in the registration processing for registering the user in the service, the authentication server 10 requests the FIDO server 1 to create a message for causing the authenticator to generate the key pair necessary for FIDO authentication, and requests the FIDO server 1 to verify attestation information of the authenticator and verify assertion information transmitted from the authenticator.

In addition, as illustrated in FIG. 1, the authentication server 10 has a function of managing a user ID, a function of reading/verifying an authentication-related context, and a function of transmitting an assertion.

The function of managing the user ID is a function of storing the user ID that is an identifier for identifying the user and a link ID that is an identifier of the user shared by the FIDO server 1 and the authentication server 10, in association with each other, and using the user ID and the link ID.

The function of reading/verifying the authentication-related context is a function of reading an authentication registration context and an authentication result context generated by the FIDO server 1 and verifying their validity. The authentication registration context is a context including a verification result of the attestation information during the registration processing and information related to a registered authentication means (the biometric authentication, etc.). The authentication result context is a context including a verification result of the assertion information during the authentication processing and information on the authentication means performed by the user.

The function of transmitting the assertion is a function of transmitting the assertion information generated by the authenticator to the FIDO server 1. The assertion information is information in which the authentication result by the authenticator has been signed using the private key. Specifically, the assertion information is a certificate of the signed authentication result.

The FIDO server 1 is an information processing device that performs processing related to FIDO authentication. The FIDO server 1 is logically separated from the authentication server 10, and is installed in the same domain or a different domain.

As illustrated in FIG. 1, the FIDO server 1 has a function of generating/verifying a FIDO message, a function of generating/transmitting the authentication-related context, and a function of managing a link ID.

The function of generating/verifying the FIDO message is a function of generating and verifying a FIDO authentication-related message. The FIDO authentication-related message is, for example, a credential generation option message (a generation instruction message of the key pair), a message related to the attestation information, or a message related to the assertion information.

The function of generating/transmitting the authentication-related context is a function of generating the authentication registration context and the authentication result context described above and transmitting them to the authentication server 10. The function of managing the link ID is a function of storing the public key generated by the authenticator in association with the link ID and using them.

As described above, in the authentication system S, the function related to FIDO authentication is separated from the authentication server 10 as the FIDO server 1, so that the service provider does not need to add the function related to the FIDO authentication to the authentication server 10. Further, since the service provider only needs to introduce a function for linking with the FIDO server 1 into the authentication server 10, the modification to the authentication server 10 can be minimized. That is, the FIDO server 1 serving as an information processing device enables the FIDO-based authentication technique to be easily introduced.

Next, a configuration example of each device of the authentication system S will be described with reference to FIGS. 2 to 5.

Figure 2:
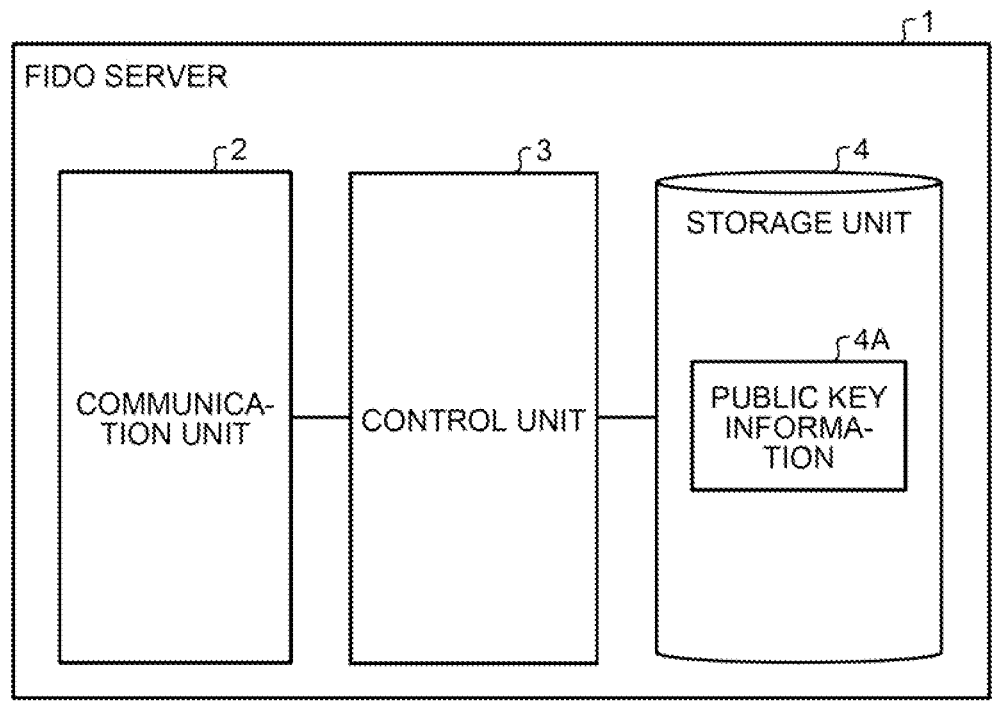
FIG. 2 is a diagram illustrating a configuration example of a FIDO server according to the embodiment.

FIG. 2 is a diagram illustrating a configuration example of the FIDO server 1 according to the embodiment. As illustrated in FIG. 2, the FIDO server 1 includes a communication unit 2, a control unit 3, and a storage unit 4.

The communication unit 2 is implemented by, for example, a network interface card (NIC) or the like. The communication unit 2 is connected to the network in a wired or wireless manner.

The control unit 3 is a controller, and is implemented by, for example, a processor such as a central processing unit (CPU) or a micro processing unit (MPU), which executes various programs (corresponding to an example of the information processing program) stored in the storage device inside the FIDO server 1 using a RAM or the like as a work area. In addition, the control unit 3 is a controller, and may be implemented by, for example, an integrated circuit such as an application specific integrated circuit (ASIC), a field programmable gate array (FPGA), or a general purpose graphic processing unit (GPGPU).

The storage unit 4 is implemented by, for example, a semiconductor memory element such as a random access memory (RAM) or a flash memory, or a storage device such as a hard disk or an optical disk. As illustrated in FIG. 2, the storage unit 4 includes public key information 4A. The details of the public key information 4A will be described later with reference to FIG. 6.

Figure 3:
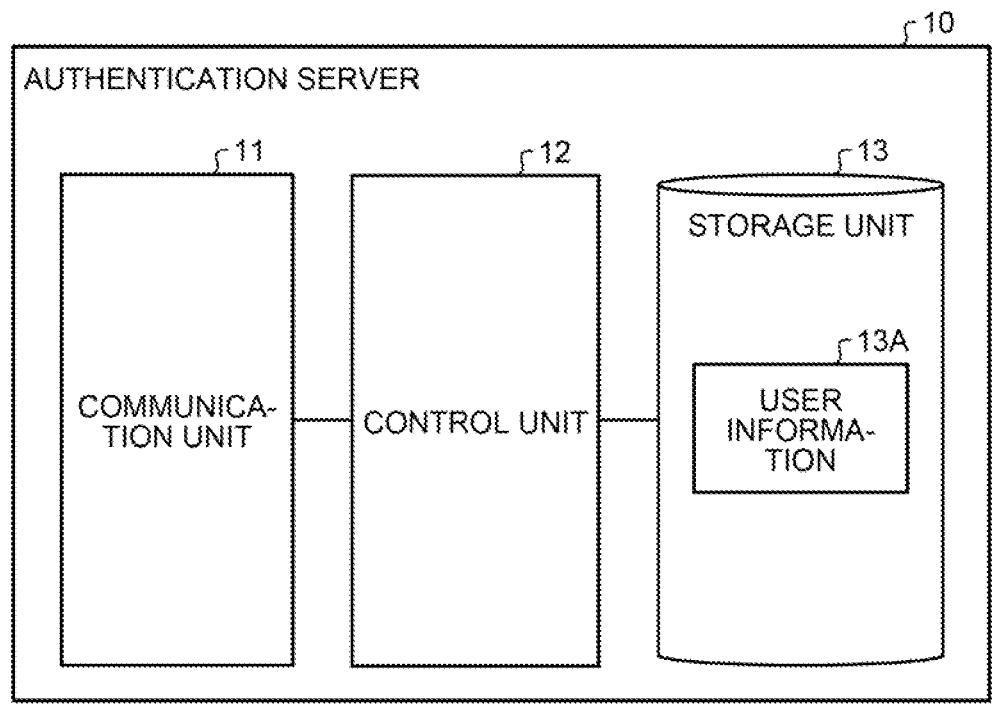
FIG. 3 is a diagram illustrating a configuration example of an authentication server according to the embodiment.

FIG. 3 is a diagram illustrating a configuration example of the authentication server 10 according to the embodiment. As illustrated in FIG. 3, the authentication server 10 includes a communication unit 11, a control unit 12, and a storage unit 13.

The communication unit 11 is implemented by, for example, a network interface card (NIC) or the like. The communication unit 2 is connected to the network in a wired or wireless manner.

The control unit 12 is a controller, and is implemented by, for example, a processor such as a central processing unit (CPU) or a micro processing unit (MPU), which executes various programs (corresponding to an example of the information processing program) stored in the storage device inside the FIDO server 1 using a RAM or the like as a work area. In addition, the control unit 12 is a controller, and may be implemented by, for example, an integrated circuit such as an application specific integrated circuit (ASIC), a field programmable gate array (FPGA), or a general purpose graphic processing unit (GPGPU).

The storage unit 13 is implemented by, for example, a semiconductor memory element such as a random access memory (RAM) or a flash memory, or a storage device such as a hard disk or an optical disk. As illustrated in FIG. 3, the storage unit 13 includes user information 13A. The details of the user information 13A will be described later with reference to FIG. 7.

Figure 4:
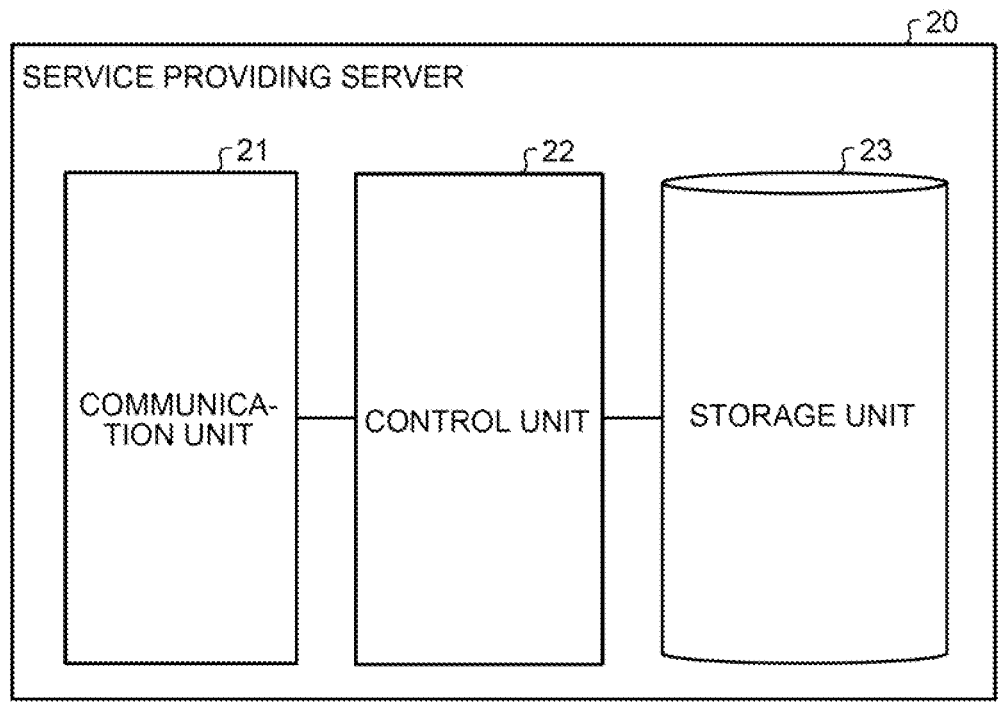
FIG. 4 is a diagram illustrating a configuration example of a service providing server according to the embodiment.

FIG. 4 is a diagram illustrating a configuration example of the service providing server 20 according to the embodiment. As illustrated in FIG. 4, the service providing server 20 includes a communication unit 21, a control unit 22, and a storage unit 23.

The communication unit 21 is implemented by, for example, a network interface card (NIC) or the like. The communication unit 2 is connected to the network in a wired or wireless manner.

The control unit 22 is a controller, and is implemented by, for example, a processor such as a central processing unit (CPU) or a micro processing unit (MPU), which executes various programs (corresponding to an example of the information processing program) stored in the storage device inside the FIDO server 1 using a RAM or the like as a work area. In addition, the control unit 22 is a controller, and may be implemented by, for example, an integrated circuit such as an application specific integrated circuit (ASIC), a field programmable gate array (FPGA), or a general purpose graphic processing unit (GPGPU).

The storage unit 23 is implemented by, for example, a semiconductor memory element such as a random access memory (RAM) or a flash memory, or a storage device such as a hard disk or an optical disk.

Figure 5:
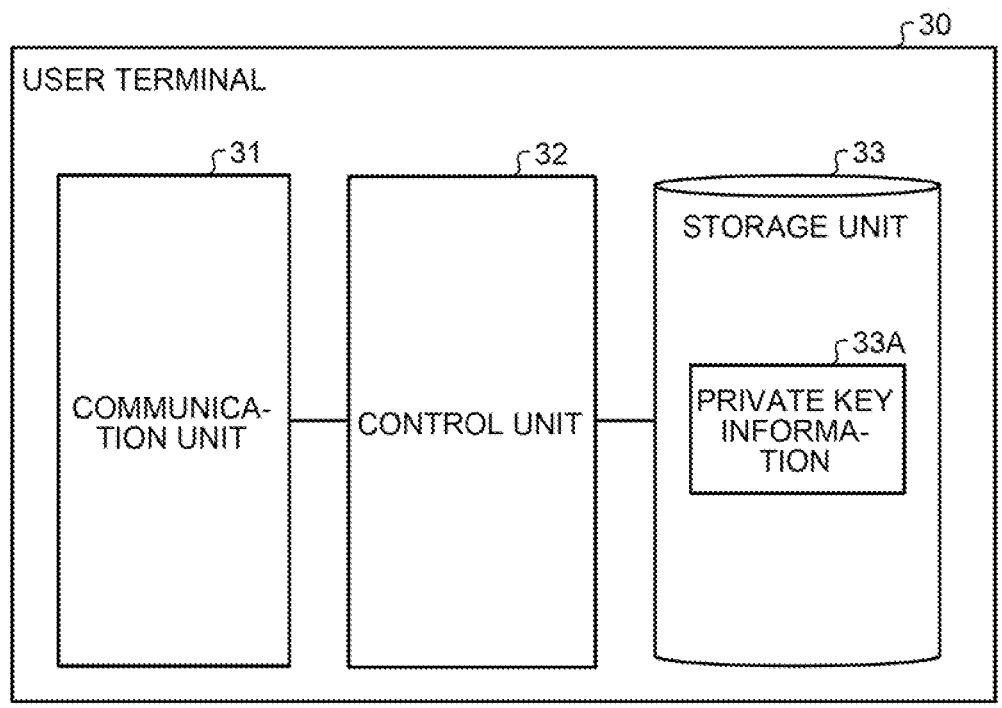
FIG. 5 is a diagram illustrating a configuration example of a user terminal according to the embodiment.

FIG. 5 is a diagram illustrating a configuration example of the user terminal 30 according to the embodiment. As illustrated in FIG. 5, the user terminal 30 includes a communication unit 31, a control unit 32, and a storage unit 33.

The communication unit 31 is implemented by, for example, a network interface card (NIC) or the like. The communication unit 2 is connected to the network in a wired or wireless manner.

The control unit 32 is a controller, and is implemented by, for example, a processor such as a central processing unit (CPU) or a micro processing unit (MPU), which executes various programs (corresponding to an example of the information processing program) stored in the storage device inside the FIDO server 1 using a RAM or the like as a work area. In addition, the control unit 32 is a controller, and may be implemented by, for example, an integrated circuit such as an application specific integrated circuit (ASIC), a field programmable gate array (FPGA), or a general purpose graphic processing unit (GPGPU).

The storage unit 33 is implemented by, for example, a semiconductor memory element such as a random access memory (RAM) or a flash memory, or a storage device such as a hard disk or an optical disk. As illustrated in FIG. 5, the storage unit 33 includes private key information 33A. The details of the private key information 33A will be described later with reference to FIG. 8.

Public Key Information 4A

FIG. 6 is a diagram illustrating an example of the public key information 4A according to the embodiment. As described above, the public key information 4A is information stored in the storage unit 4 of the FIDO server 1, and includes information on the public key generated by the authenticator.

In the example of FIG. 6, the public key information 4A includes items such as "link ID", "authentication server", "user ID", and "public key".

The "link ID" is an identifier of the user shared with the linked authentication server 10. The "authentication server" is information for identifying the linked authentication server 10. The "user ID" is an identifier for identifying the user that is issued by the authentication server 10. The "public key" is information on the public key.

User Information 13A

FIG. 7 is a diagram illustrating an example of the user information 13A according to the embodiment. As described above, the user information 13A is information stored in the storage unit 13 of the authentication server 10, and includes information related to the user who has completed the registration processing for receiving the service.

In the example of FIG. 7, the user information 13A includes items such as "user ID", "link ID", "attribute information", and "authentication means".

The "user ID" is an identifier for identifying the user. The "link ID" is an identifier of the user shared with the linked FIDO server 1. The "attribute information" is information related to an attribute of the user. The "authentication means" is information on an authentication means by the authenticator.

Private Key Information 33A

FIG. 8 is a diagram illustrating an example of the private key information 33A according to the embodiment. As described above, the private key information 33A is information stored in the storage unit 33 of the user terminal 30, and includes information on the private key generated by the authenticator.

In the example of FIG. 8, the private key information 33A includes items such as "service", "authentication server", and "private key".

The "service" is information for identifying a service subject to authentication. The "authentication server" is information for identifying the authentication server 10. The "private key" is information on the private key.

Next, an operation example of the authentication system S will be described with reference to FIGS. 9 to 14. Hereinafter, an operation example where the FIDO server 1 and the authentication server 10 are arranged in the same domain will be described with reference to FIGS. 9 and 10, and an operation example where the FIDO server 1 and the authentication server 10 are arranged in different domains will be described with reference to FIGS. 11 to 14.

First, the operation example where the FIDO server 1 and the authentication server 10 are arranged in the same domain will be described with reference to FIGS. 9 and 10. In other words, the FIDO server 1 is arranged in a position like the back end of the authentication server 10.

Registration Processing in the Same Domain

First, user registration processing in the authentication system S according to the embodiment will be described with reference to FIG. 9. FIG. 9 is a sequence diagram illustrating an example of the registration processing executed by the authentication system S according to the embodiment. Note that FIG. 9 illustrates the user terminal 30 and the authenticator separately for convenience of description.

Figure 9:
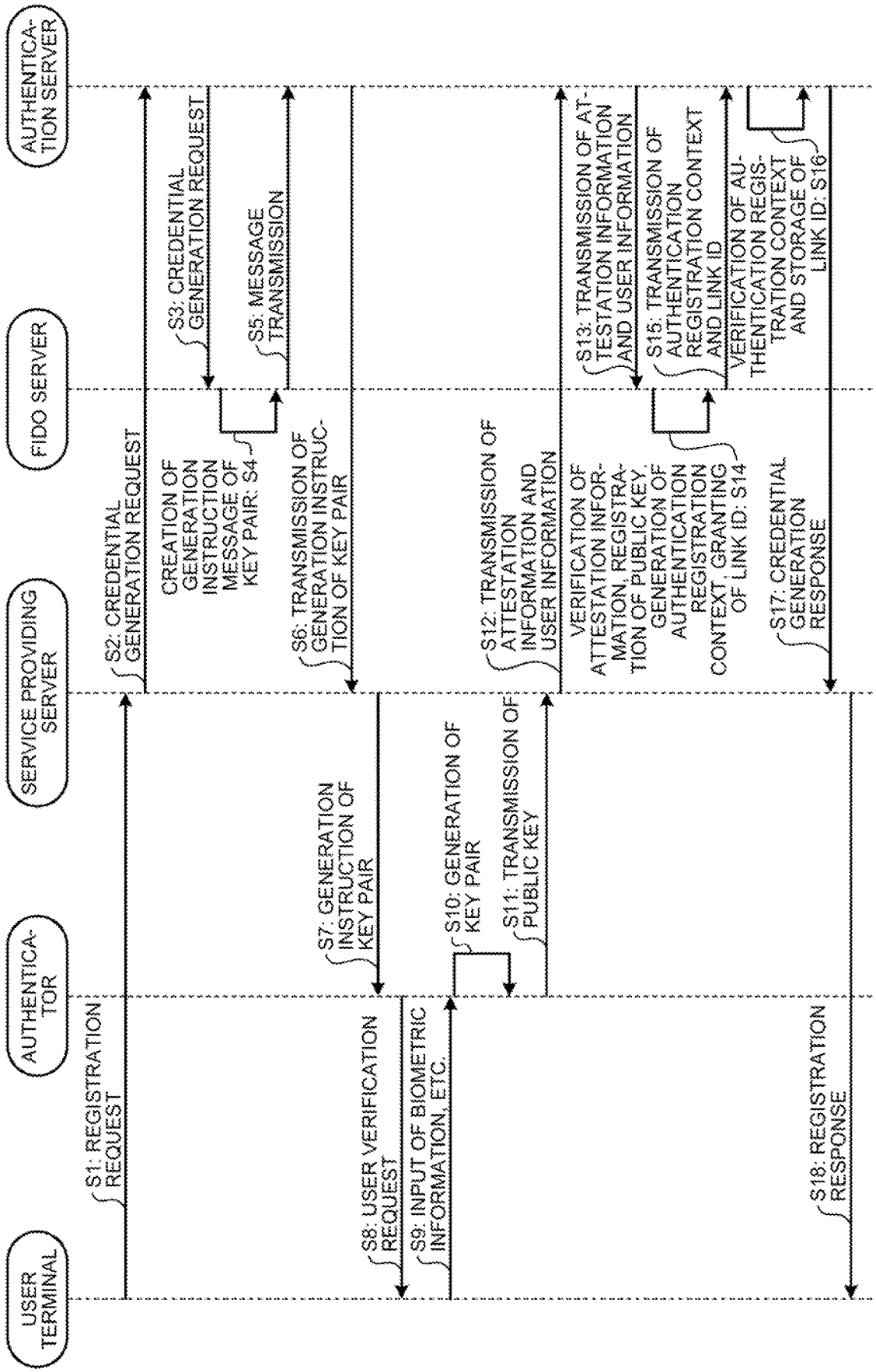
FIG. 9 is a sequence diagram illustrating an example of registration processing executed by the authentication system according to the embodiment.

The registration processing illustrated in FIG. 9 is processing for registering the identity of the user with respect to a service that requires authentication. As illustrated in FIG. 9, first, the user terminal 30 transmits a registration request to the service providing server 20 (step S1).

Subsequently, the service providing server 20 transmits a credential generation request to the authentication server 10 (step S2). The credential generation request is a request for the authenticator to generate a key pair.

Subsequently, the authentication server 10 transmits the acquired credential generation request to the FIDO server 1 (step S3). Subsequently, the FIDO server 1 creates the generation instruction message of a key pair based on the credential generation request (step S4).

Subsequently, the FIDO server 1 transmits the generation instruction message to the authentication server 10 (step S5).

Subsequently, the authentication server 10 transmits the generation instruction message of the key pair to the service providing server 20 (step S6).

Subsequently, the service providing server 20 transmits the generation instruction message of the key pair to the authenticator (step S7). That is, in steps S1 to S7, the control unit 3 acquires, from the authentication server 10, a generation request of the key pair for FIDO authentication transmitted from the user terminal 30 including the authenticator for FIDO authentication to the authentication server 10, generates a generation instruction for causing the authenticator to generate the key pair based on the generation request, and notifies the authenticator of the generation instruction via the authentication server 10. That is, since the authentication server 10 does not have a function of generating the FIDO authentication-related message (the generation instruction or an acquisition instruction to be described later), the authentication server 10 requests the FIDO server 1 having the function of generating the FIDO authentication-related message to generate the message. With this configuration, since it is not necessary to introduce the function of generating the FIDO authentication-related message into the authentication server 10, it is possible to easily introduce the FIDO-based authentication technique.

Subsequently, the authenticator transmits a user verification request (step S8). The user verification request is a request for the user to input the biometric information, etc. using the authenticator.

Subsequently, the user terminal 30 inputs the biometric information, etc. to the authenticator according to the user's operation (step S9).

Subsequently, the authenticator generates the key pair (the private key and the public key) (step S10) and transmits the public key to the service providing server 20 (step S11).

Subsequently, the service providing server 20 transmits the attestation information and the user information (the biometric information and the public key) to the authentication server 10 (step S12). In step S12, the service providing server 20 may transmit additional information related to the user by obtaining consent from the user. The additional information includes, for example, position information of the user (the position information of the user terminal 30). In addition, the additional information may include behavior information of the user, attribute information, and the like.

That is, the control unit 3 of the FIDO server 1 acquires the additional information together with the attestation information via the authentication server 10.

Subsequently, the authentication server 10 transmits the attestation information and the user information (the biometric information and the public key) to the FIDO server 1 (step S13).

Subsequently, the FIDO server 1 verifies the attestation information, grants the link ID, registers the public key, and generates the authentication registration context indicating whether or not to register the user based on the verification result of the attestation information (step S14).

Subsequently, the FIDO server 1 transmits the authentication registration context and the link ID to the authentication server 10 (step S15). That is, in steps S10 to S15, the control unit 3 acquires, via the authentication server 10, the public key of the key pair generated by the authenticator according to the generation instruction, stores the acquired public key in association with the link ID, and notifies the authentication server 10 of the link ID. In addition, the control unit 3, when acquiring the public key, acquires the attestation information of the authenticator via the authentication server 10, generates the authentication registration context indicating whether or not to register the user based on the verification result of the attestation information, and notifies the authentication server 10 of the authentication registration context. When the FIDO server 1 acquires the additional information, the FIDO server 1 stores the additional information in association with the public key and the link ID. That is, since the authentication server 10 does not have a function of verifying the attestation information and the assertion information to be described later (including a function of reading the attestation information and the assertion information), the authentication server 10 requests the FIDO server 1 having the function of verifying the attestation information and the assertion information to verify the attestation information and the assertion information. With this configuration, since it is not necessary to introduce the function of verifying the attestation information and the assertion information into the authentication server 10, it is possible to easily introduce the FIDO-based authentication technique.

Subsequently, the authentication server 10 verifies the authentication registration context and stores the link ID in association with the user ID (step S16).

Subsequently, if there is no problem as a result of the verification of the authentication registration context, the authentication server 10 transmits a credential generation response to the service providing server 20 (step S17). Subsequently, the service providing server 20 transmits a registration response indicating that the registration has been completed to the user terminal 30 (step S18).

Authentication Processing in the Same Domain

Next, the authentication processing of the user in the authentication system S according to the embodiment will be described with reference to FIG. 10. FIG. 10 is a sequence diagram illustrating an example of the authentication processing executed by the authentication system S according to the embodiment.

Figure 10:
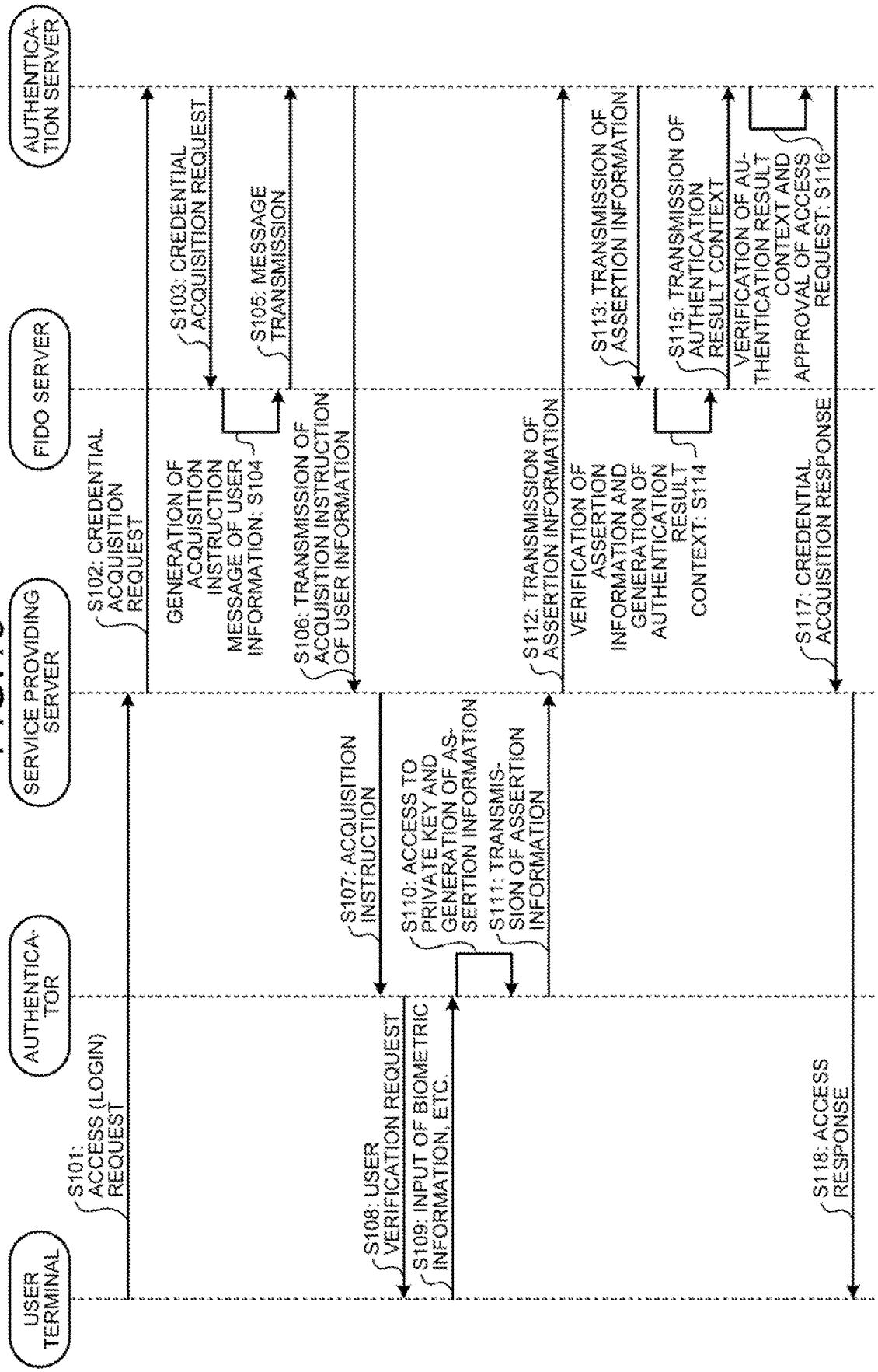
FIG. 10 is a sequence diagram illustrating an example of authentication processing executed by the authentication system according to the embodiment.

The authentication processing illustrated in FIG. 10 is processing for, when the user requests the access (or login) to the service for which the identity has been registered, checking the identity of the user and approving the access (login). As illustrated in FIG. 10, first, the user terminal 30 transmits an access (or login) request to the service providing server 20 (step S101).

Subsequently, the service providing server 20 transmits a credential acquisition request to the authentication server 10 (step S102). The credential acquisition request includes the information on the user ID and is a request for authentication processing of the identity of the user corresponding to the user ID (authentication request).

Subsequently, the authentication server 10 transmits the acquired credential acquisition request to the FIDO server 1 together with the link ID (step S103). Subsequently, the FIDO server 1 selects a corresponding public key based on the credential acquisition request and the link ID, and creates an acquisition instruction message of the user information (authentication information such as the biometric information) corresponding to the selected public key (step S104).

Subsequently, the FIDO server 1 transmits the acquisition instruction message to the authentication server 10 (step S105).

Subsequently, the authentication server 10 transmits the acquisition instruction message of the user information for authentication to the service providing server 20 (step S106).

Subsequently, the service providing server 20 transmits the acquisition instruction message of the user information for authentication to the authenticator (step S107). That is, in steps S101 to S107, the control unit 3 acquires the authentication request, together with the link ID corresponding to the target user, via the authentication server 10 from the service providing server 20 to which the access is requested from the user terminal 30, generates the acquisition instruction of the authentication information corresponding to the link ID, and notifies the authenticator of the acquisition instruction via the authentication server 10.

Subsequently, the authenticator transmits the user verification request based on the acquisition request (step S108). The user verification request is a request for the user to input designated user information (the biometric information, etc.) using the authenticator.

Subsequently, the user terminal 30 inputs the biometric information, etc. to the authenticator according to the user's operation (step S109).

Subsequently, the authenticator accesses the private key based on the input biometric information and generates the assertion information (step S110). Specifically, the authenticator generates, as the assertion information, a certificate of signed authentication information that has been signed using the corresponding private key in the input biometric information (the authentication information). Subsequently, the authenticator transmits the assertion information to the service providing server 20 (step S111).

Subsequently, the service providing server 20 transmits the assertion information to the authentication server 10 (step S112). In step S112, the service providing server 20 may transmit additional information related to the user by obtaining consent from the user. The additional information includes, for example, position information of the user (the position information of the user terminal 30). In addition, the additional information may include behavior information of the user, attribute information, and the like.

That is, the control unit 3 of the FIDO server 1 acquires the additional information together with the assertion information via the authentication server 10.

Subsequently, the authentication server 10 transmits the assertion information to the FIDO server 1 (step S113).

Subsequently, the FIDO server 1 verifies the assertion information and generates the authentication result context indicating whether or not to authenticate the user based on the verification result of the assertion information (step S114). When the FIDO server 1 acquires the additional information together with the assertion information, the FIDO server 1 includes information based on the verification result of the additional information in the authentication result context.

Subsequently, the FIDO server 1 transmits the authentication result context to the authentication server 10 (step S115). That is, in steps S110 to S115, the control unit 3 acquires, via the authentication server 10, the assertion information in which the authentication information acquired by the authenticator according to the acquisition instruction has been signed using the private key, generates the authentication result context indicating whether or not to authenticate the user based on the verification result of the assertion information, and notifies the authentication server 10 of the authentication result context.

Subsequently, the authentication server 10 verifies the authentication result context, and if there is no problem as a result of the verification, approves the access request to the service (step S116), and transmits a credential acquisition response indicating that the access has been approved to the service providing server 20 (step S117). Subsequently, the service providing server 20 transmits an access response indicating that the access has been approved to the user terminal 30 (step S118) and provides the service to the user terminal 30.

Figure 11:
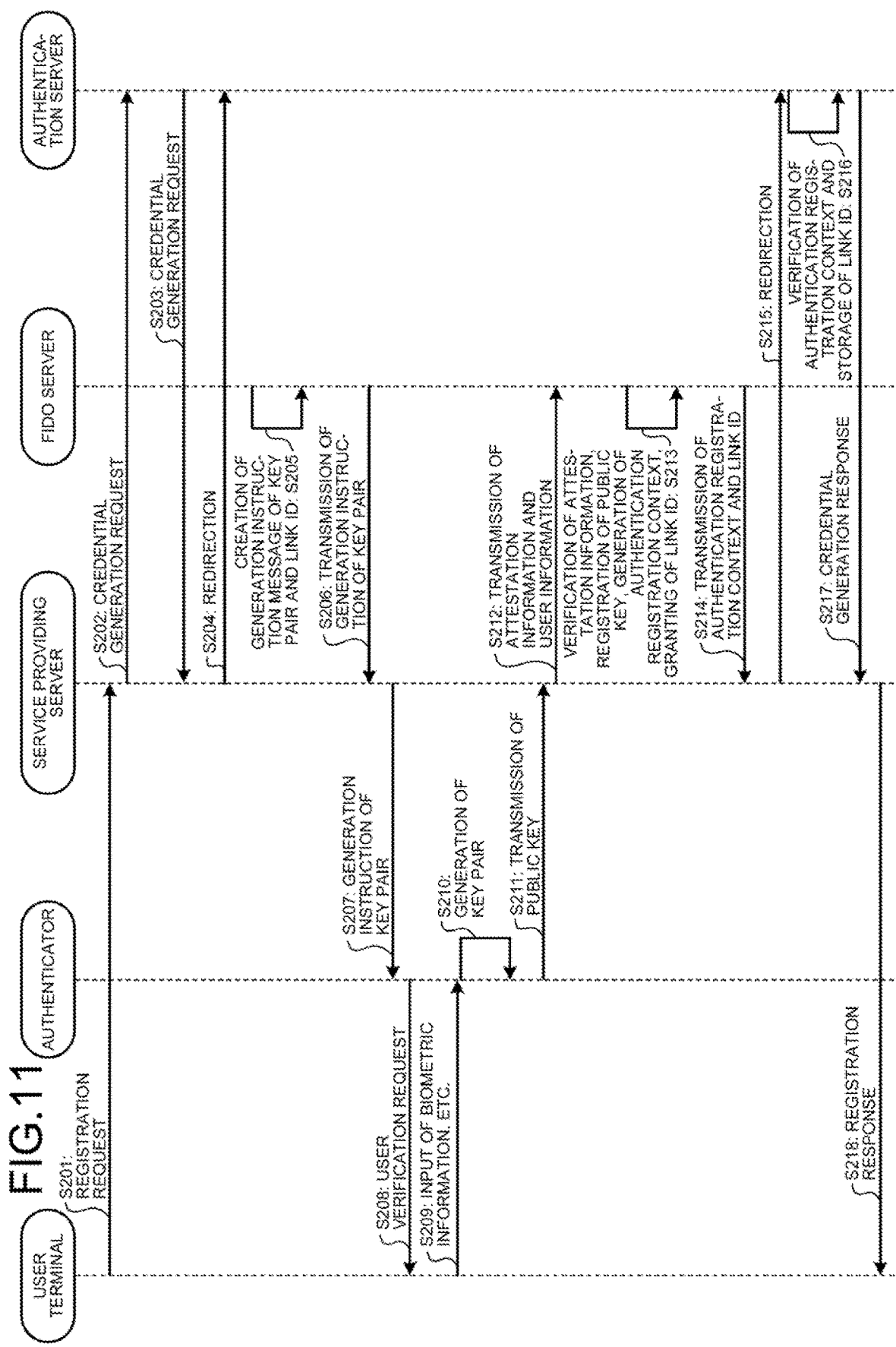
FIG. 11 is a sequence diagram illustrating an example of the registration processing executed by the authentication system according to the embodiment.
Figure 12:
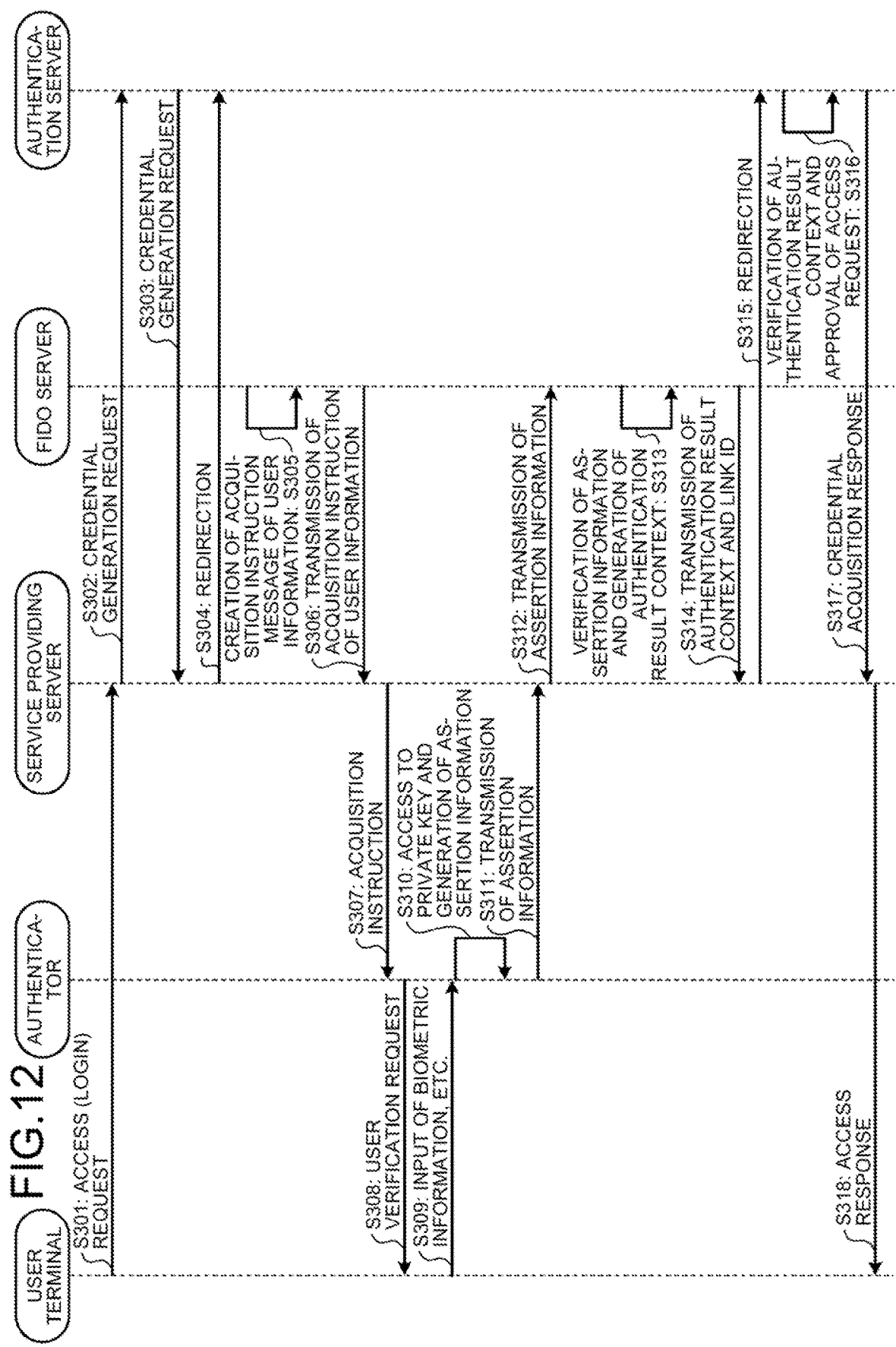
FIG. 12 is a sequence diagram illustrating an example of the authentication processing executed by the authentication system according to the embodiment.
Figure 13:
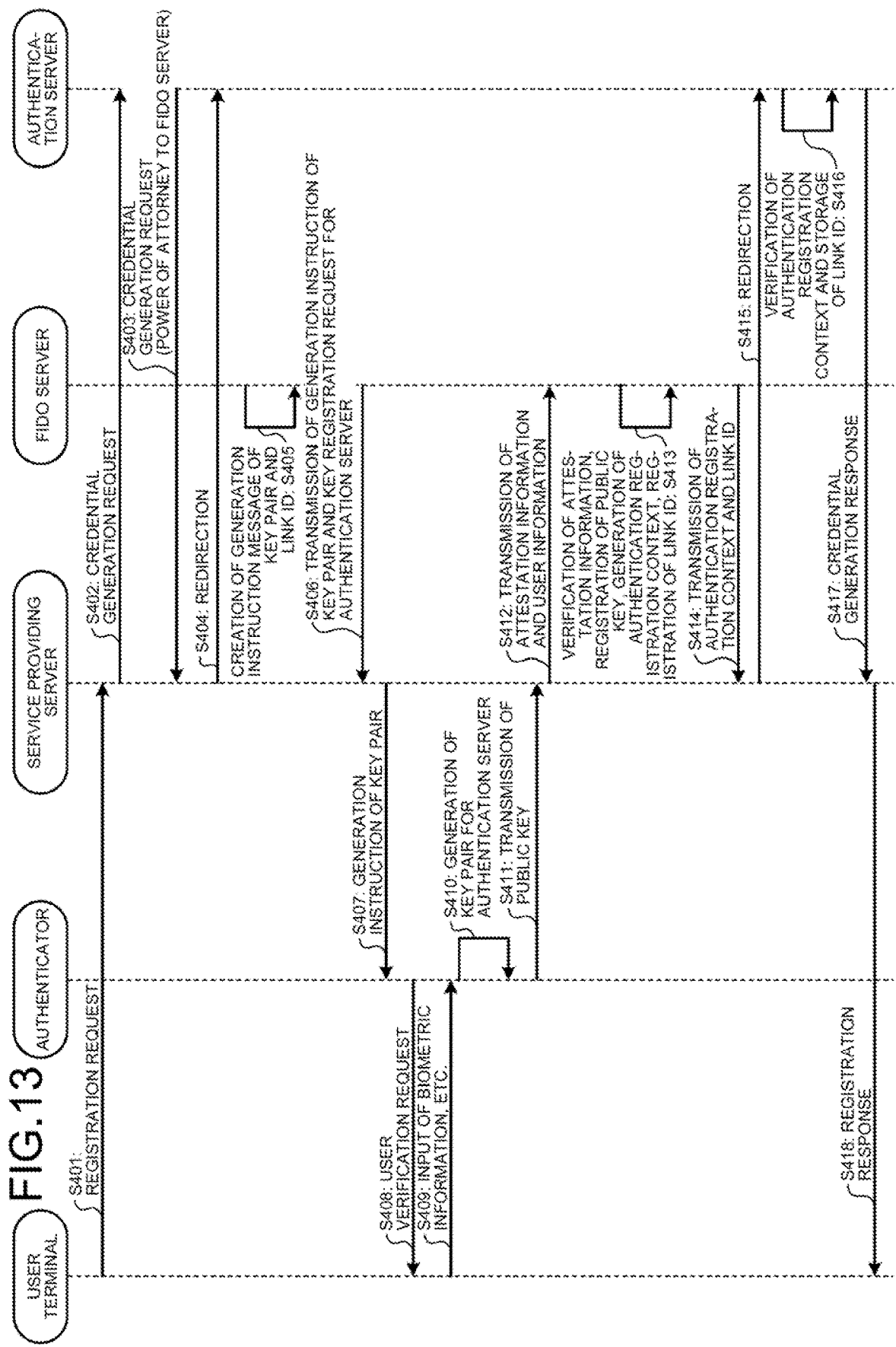
FIG. 13 is a sequence diagram illustrating an example of the registration processing executed by the authentication system according to the embodiment.
Figure 14:
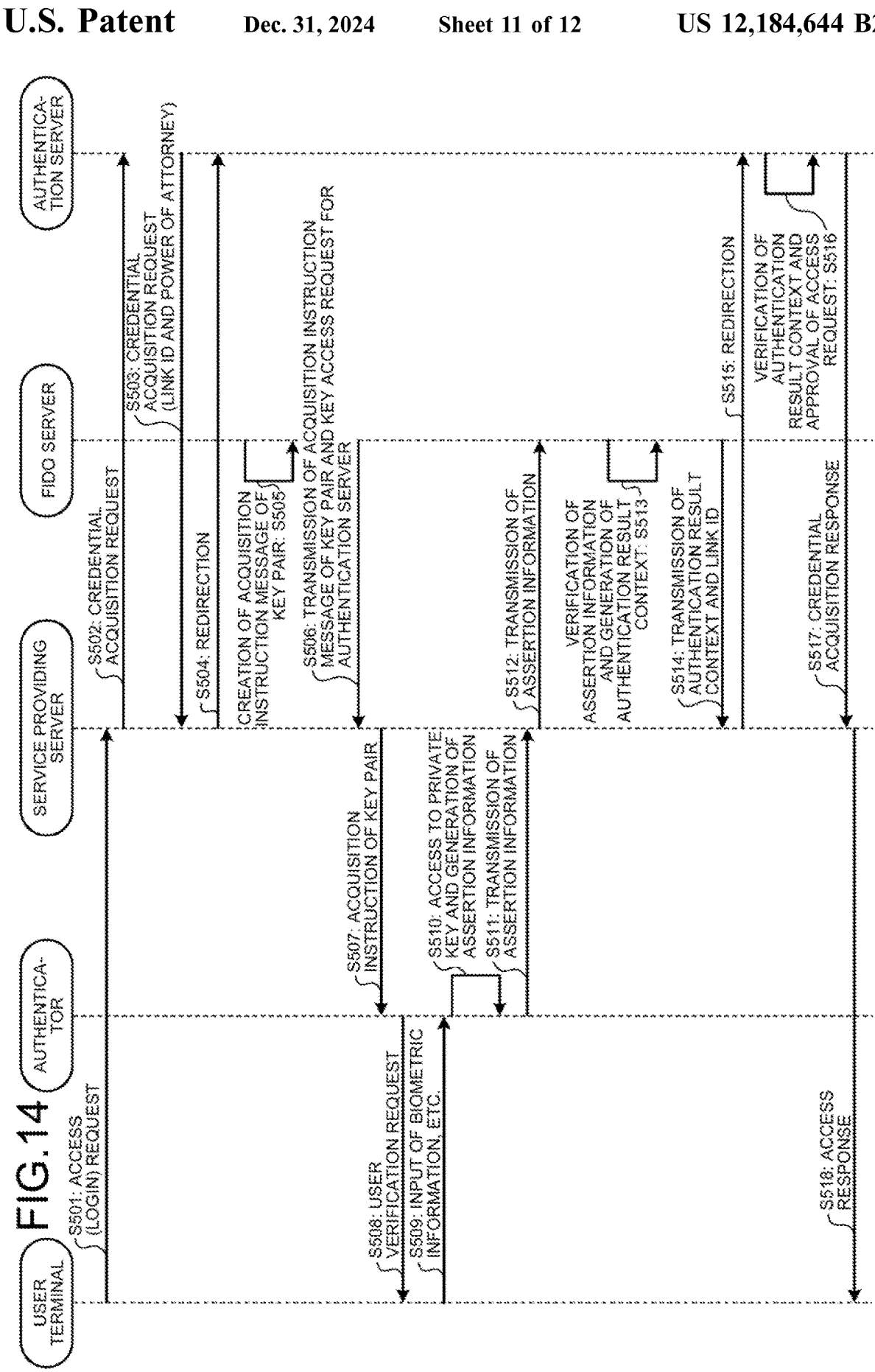
FIG. 14 is a sequence diagram illustrating an example of the authentication processing executed by the authentication system according to the embodiment.

Next, the operation example where the FIDO server 1 and the authentication server 10 are arranged in different domains will be described with reference to FIGS. 11 to 14. In a case where the FIDO server 1 and the authentication server 10 are arranged in different domains, the authentication server 10 transmits various requests to the FIDO server 1 by causing the service providing server 20 to perform redirection. FIGS. 11 and 12 illustrate an operation example where the authentication server 10 is not explicitly indicated during the redirection, and FIGS. 13 and 14 illustrate an operation example where the authentication server 10 is explicitly indicated by a power of attorney during the redirection.

Registration Processing 1 in Different Domains

First, user registration processing in the authentication system S according to the embodiment will be described with reference to FIG. 11. FIG. 11 is a sequence diagram illustrating an example of the registration processing executed by the authentication system S according to the embodiment.

As illustrated in FIG. 11, first, the user terminal 30 transmits the registration request to the service providing server 20 (step S201).

Subsequently, the service providing server 20 transmits the credential generation request to the authentication server 10 (step S202).

Subsequently, the authentication server 10 returns the acquired credential generation request to the service providing server 20 together with the information on the redirection destination (FIDO server 1) (step S203), and the service providing server 20 redirects the credential generation request to the FIDO server 1 (step S204). Subsequently, the FIDO server 1 creates the generation instruction message of the key pair based on the credential generation request (step S205).

Subsequently, the FIDO server 1 transmits the generation instruction message of the key pair to the service providing server 20 (step S206).

Subsequently, the service providing server 20 transmits the generation instruction message of the key pair to the authenticator (step S207). Subsequently, the authenticator transmits the user verification request (step S208). That is, in steps S201 to S207, the control unit 3 acquires, from the service providing server 20, the generation request of the key pair for FIDO authentication transmitted from the user terminal 30 including the authenticator for FIDO authentication to the service providing server 20 via the authentication server 10, generates the generation instruction for causing the authenticator to generate the key pair based on the generation request, and notifies the authenticator of the generation instruction via the service providing server 20. That is, since the authentication server 10 does not have the function of generating the FIDO authentication-related message (the generation instruction or acquisition instruction to be described later), the authentication server 10 requests the FIDO server 1 having the function of generating the FIDO authentication-related message to generate the message via the service providing server 20. With this configuration, since it is not necessary to introduce the function of generating the FIDO authentication-related message into the authentication server 10, it is possible to easily introduce the FIDO-based authentication technique.

Subsequently, the user terminal 30 inputs the biometric information, etc. to the authenticator according to the user's operation (step S209).

Subsequently, the authenticator generates the key pair (the private key and the public key) (step S210) and transmits the public key to the service providing server 20 (step S211).

Subsequently, the service providing server 20 transmits the attestation information and the user information (the biometric information and the public key) to the FIDO server 1 (step S212). The service providing server 20 may transmit the additional information together with the attestation information.

Subsequently, the FIDO server 1 verifies the attestation information, grants the link ID, registers the public key, and generates the authentication registration context based on the verification result of the attestation information (step S213).

Subsequently, the FIDO server 1 returns the authentication registration context and the link ID to the service providing server 20 together with the information on the redirection destination (authentication server 10) (step S214), and the service providing server 20 redirects the authentication registration context and the link ID to the authentication server 10 (step S215). That is, in steps S210 to S215, the control unit 3 acquires, via the service providing server 20, the public key of the key pair generated by the authenticator according to the generation instruction, stores the acquired public key in association with the link ID, and notifies the authentication server 10 of the link ID via the service providing server 20. In addition, the control unit 3, when acquiring the public key, acquires the attestation information of the authenticator via the service providing server 20, generates the authentication registration context indicating whether or not to register the user based on the verification result of the attestation information, and notifies the authentication server 10 of the authentication registration context via the service providing server 20. That is, since the authentication server 10 does not have the function of verifying the attestation information and the assertion information (including the function of reading the attestation information and the assertion information), the authentication server 10 requests the FIDO server 1 having the function of verifying the attestation information and the assertion information to verify the attestation information and the assertion information via the service providing server 20. With this configuration, since it is not necessary to introduce the function of verifying the attestation information and the assertion information into the authentication server 10, it is possible to easily introduce the FIDO-based authentication technique.

Subsequently, the authentication server 10 verifies the authentication registration context and stores the link ID in association with the user ID (step S216).

Subsequently, if there is no problem as a result of the verification of the authentication registration context, the authentication server 10 transmits the credential generation response to the service providing server 20 (step S217). Subsequently, the service providing server 20 transmits the registration response indicating that the registration has been completed to the user terminal 30 (step S218).

Authentication Processing 1 in Different Domains

Next, the authentication processing of the user in the authentication system S according to the embodiment will be described with reference to FIG. 12. FIG. 12 is a sequence diagram illustrating an example of the authentication processing executed by the authentication system S according to the embodiment.

As illustrated in FIG. 11, first, the user terminal 30 transmits the access (or login) request to the service providing server 20 (step S301).

Subsequently, the service providing server 20 transmits the credential acquisition request to the authentication server 10 (step S302). The credential acquisition request includes the information on the user ID.

Subsequently, the authentication server 10 returns the acquired credential acquisition request to the service providing server 20 together with the information on the link ID and the redirection destination (FIDO server 1) (step S303), and the service providing server 20 redirects the credential acquisition request and the link ID to the FIDO server 1 (step S304). Subsequently, the FIDO server 1 selects a corresponding public key based on the credential acquisition request and the link ID, and creates the acquisition instruction message of the user information (the biometric information, etc. for authentication) corresponding to the selected public key (step S305).

Subsequently, the FIDO server 1 transmits the acquisition instruction message to the service providing server 20 (step S306).

Subsequently, the service providing server 20 transmits the acquisition instruction message of the user information for authentication to the authenticator (step S307). That is, in steps S301 to S307, the control unit 3, when the user terminal 30 requests the access to the service providing server 20, acquires the authentication request, together with the link ID corresponding to the target user, from the service providing server 20 via the authentication server 10, generates the acquisition instruction of the authentication information corresponding to the link ID, and notifies the authenticator of the acquisition instruction via the service providing server 20.

Subsequently, the authenticator transmits the user verification request based on the acquisition instruction (step S308). Subsequently, the user terminal 30 inputs the biometric information, etc. to the authenticator according to the user's operation (step S309).

Subsequently, the authenticator accesses the private key based on the input biometric information and generates the assertion information (step S310). Specifically, the authenticator authenticates the user based on the input biometric information to generate the authentication result, and generates, as the assertion information, the certificate of the signed authentication result in which the authentication result has been signed using the corresponding private key.

Subsequently, the authenticator transmits the assertion information to the service providing server 20 (step S311).

Subsequently, the service providing server 20 transmits the assertion information to the FIDO server 1 (step S312). The service providing server 20 may transmit the additional information together with the assertion information.

Subsequently, the FIDO server 1 verifies the assertion information and generates the authentication result context based on the verification result of the assertion information (step S313).

Subsequently, the FIDO server 1 transmits the authentication result context and the link ID to the service providing server 20 together with the information on the redirection destination (authentication server 10) (step S314), and the service providing server 20 redirects the authentication result context and the link ID to the authentication server 10 (step S315). That is, in steps S310 to S315, the control unit 3 acquires, via the service providing server 20, the assertion information in which the authentication information acquired by the authenticator according to the acquisition instruction has been signed using the private key, generates the authentication result context indicating whether or not to authenticate the user based on the verification result of the assertion information, and notifies the authentication server 10 of the authentication result context via the service providing server 20.

Subsequently, the authentication server 10 verifies the authentication result context, and if there is no problem as a result of the verification, approves the access request to the service (step S316), and transmits the credential acquisition response indicating that the access has been approved to the service providing server 20 (step S317). Subsequently, the service providing server 20 transmits the access response indicating that the access has been approved to the user terminal 30 (step S318) and provides the service to the user terminal 30.

An operation example where the authentication server 10 is explicitly indicated by the power of attorney during the redirection will be described with reference to FIGS. 13 and 14.

Registration Processing 2 in Different Domains

First, user registration processing in the authentication system S according to the embodiment will be described with reference to FIG. 13. FIG. 13 is a sequence diagram illustrating an example of the registration processing executed by the authentication system S according to the embodiment.

As illustrated in FIG. 13, first, the user terminal 30 transmits the registration request to the service providing server 20 (step S401).

Subsequently, the service providing server 20 transmits the credential generation request to the authentication server 10 (step S402).

Subsequently, the authentication server 10 attaches the power of attorney to the FIDO server 1 to the acquired credential generation request, and returns the credential generation request to the service providing server 20 together with the information on the redirection destination (FIDO server 1) (step S403), and the service providing server 20 redirects the credential generation request to the FIDO server 1 (step S404). The power of attorney is information explicitly indicating that the registration of FIDO authentication is delegated to the FIDO server 1, and includes information on the authentication server 10 that is a delegation source. Subsequently, the FIDO server 1 creates the generation instruction message of the key pair based on the credential generation request (step S405).

Subsequently, the FIDO server 1 transmits the generation instruction message of the key pair to the service providing server 20 (step S406).

Subsequently, the service providing server 20 transmits the generation instruction message of the key pair to the authenticator (step S407). Subsequently, the authenticator transmits the user verification request (step S408).

Subsequently, the user terminal 30 inputs the biometric information, etc. to the authenticator according to the user's operation (step S409).

Subsequently, the authenticator generates the key pair (the private key and the public key) (step S410) and transmits the public key to the service providing server 20 (step S411).

Subsequently, the service providing server 20 transmits the attestation information and the user information (the biometric information and the public key) to the FIDO server 1 (step S412).

Subsequently, the FIDO server 1 verifies the attestation information, grants the link ID, registers the public key, and generates the authentication registration context based on the verification result of the attestation information (step S413).

Subsequently, the FIDO server 1 transmits the authentication registration context and the link ID to the service providing server 20 together with the information on the redirection destination (authentication server 10) (step S414), and the service providing server 20 redirects the authentication registration context and the link ID to the authentication server 10 (step S415).

Subsequently, the authentication server 10 verifies the authentication registration context and stores the link ID in association with the user ID (step S416).

Subsequently, if there is no problem as a result of the verification of the authentication registration context, the authentication server 10 transmits the credential generation response to the service providing server 20 (step S417). Subsequently, the service providing server 20 transmits the registration response indicating that the registration has been completed to the user terminal 30 (step S418).

Authentication Processing 2 in Different Domains

Next, the authentication processing of the user in the authentication system S according to the embodiment will be described with reference to FIG. 14. FIG. 14 is a sequence diagram illustrating an example of the authentication processing executed by the authentication system S according to the embodiment.

As illustrated in FIG. 14, first, the user terminal 30 transmits the access (or login) request to the service providing server 20 (step S501).

Subsequently, the service providing server 20 transmits the credential acquisition request to the authentication server 10 (step S502). The credential acquisition request includes the information on the user ID.

Subsequently, the authentication server 10 attaches the power of attorney to the FIDO server 1 to the acquired credential acquisition request, and returns the credential acquisition request to the service providing server 20 together with the information on the link ID and the redirection destination (FIDO server 1) (step S503), and the service providing server 20 redirects the credential acquisition request and the link ID to the FIDO server 1 (step S504). The power of attorney is information explicitly indicating that the authentication of FIDO authentication is delegated to the FIDO server 1, and includes information on the authentication server 10 that is the delegation source. Subsequently, the FIDO server 1 selects a corresponding public key based on the credential acquisition request and the link ID, and creates the acquisition instruction message of the user information (the biometric information, etc. for authentication) corresponding to the selected public key (step S505).

Subsequently, the FIDO server 1 transmits the acquisition instruction message to the service providing server 20 (step S506).

Subsequently, the service providing server 20 transmits the acquisition instruction message of the user information for authentication to the authenticator (step S507).

Subsequently, the authenticator transmits the user verification request based on the acquisition instruction (step S508). Subsequently, the user terminal 30 inputs the biometric information, etc. to the authenticator according to the user's operation (step S509).

Subsequently, the authenticator accesses the private key based on the input biometric information and generates the assertion information (step S510). Specifically, the authenticator authenticates the user based on the input biometric information to generate the authentication result, and generates, as the assertion information, the certificate of the signed authentication result in which the authentication result has been signed using the corresponding private key. Subsequently, the authenticator transmits the assertion information to the service providing server 20 (step S511).

Subsequently, the service providing server 20 transmits the assertion information to the FIDO server 1 (step S512).

Subsequently, the FIDO server 1 verifies the assertion information and generates the authentication result context based on the verification result of the assertion information (step S513).

Subsequently, the FIDO server 1 transmits the authentication result context and the link ID to the service providing server 20 together with the information on the redirection destination (authentication server 10) (step S514), and the service providing server 20 redirects the authentication result context and the link ID to the authentication server 10 (step S515).

Subsequently, the authentication server 10 verifies the authentication result context, and if there is no problem as a result of the verification, approves the access request to the service (step S516), and transmits the credential acquisition response indicating that the access has been approved to the service providing server 20 (step S517). Subsequently, the service providing server 20 transmits the access response indicating that the access has been approved to the user terminal 30 (step S518) and provides the service to the user terminal 30.

Others

In addition, among the processing described in the above embodiment, a part of the processing described as being automatically performed may be manually performed. Alternatively, all or some of the processing described as being manually performed may be automatically performed by a known method. Furthermore, the processing procedures, specific names, and information including various data and parameters illustrated in the above document and drawings may be arbitrarily changed unless otherwise specified. For example, the various information illustrated in the drawings is not limited to the illustrated information.

In addition, the components of the devices illustrated in the drawings are functionally conceptual, and need not necessarily be physically configured as illustrated in the drawings. That is, specific forms of distribution and integration of the devices are not limited to the forms illustrated in the drawings, and all or some of the devices may be functionally or physically distributed and integrated in arbitrary units according to various loads, usage conditions, and the like.

For example, some or all of the storage unit 4 illustrated in FIG. 2, the storage unit 13 illustrated in FIG. 3, the storage unit 23 illustrated in FIG. 5, and the storage unit 33 illustrated in FIG. 6 may be held in a storage server or the like instead of being held by each device. In this case, each device acquires various types of information by accessing the storage server.

Hardware Configuration

Figure 15:
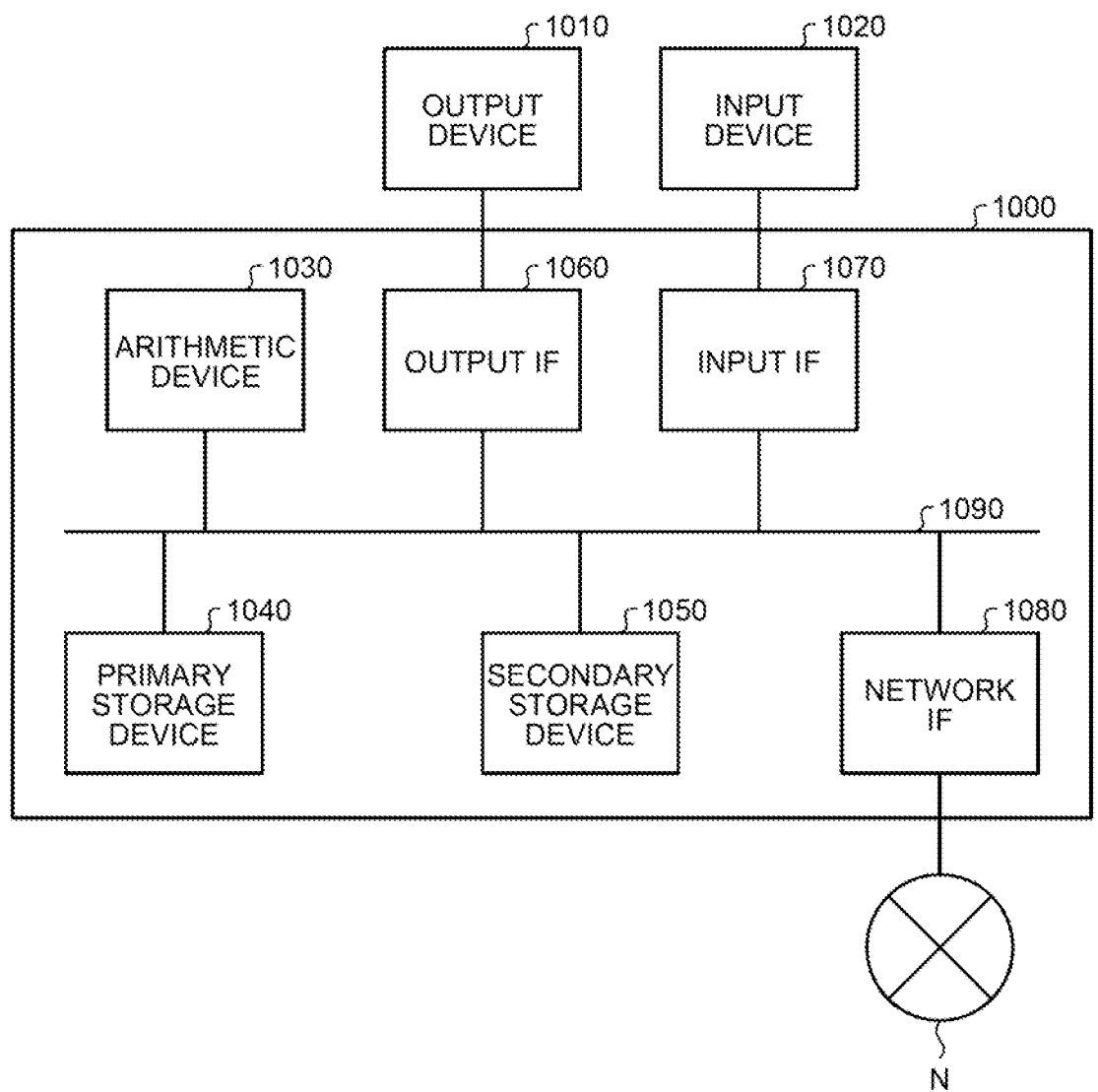
FIG. 15 is a diagram illustrating an example of a hardware configuration.

In addition, the FIDO server 1 according to the above-described embodiment is implemented by, for example, a computer 1000 having a configuration as illustrated in FIG. 15. FIG. 15 is a diagram illustrating an example of the hardware configuration. The computer 1000 is connected to an output device 1010 and an input device 1020, and has a form in which an arithmetic device 1030, a primary storage device 1040, a secondary storage device 1050, an output interface (IF) 1060, an input IF 1070, and a network IF 1080 are connected by a bus 1090.

The arithmetic device 1030 operates based on a program stored in the primary storage device 1040 or the secondary storage device 1050, a program read from the input device 1020, or the like, and executes various processing. The primary storage device 1040 is a memory device such as a RAM that temporarily stores data that is used for various arithmetic operations by the arithmetic device 1030. The secondary storage device 1050 is a storage device in which data used for various arithmetic operations by the arithmetic device 1030 and various databases are registered, and is implemented by a read only memory (ROM), a hard disk drive (HDD), a flash memory, and the like.

The output IF 1060 is an interface for transmitting information to be output to the output device 1010 that outputs various information such as a monitor and a printer, and is implemented by, for example, a connector of a standard such as Universal Serial Bus (USB), Digital Visual Interface (DVI), or High Definition Multimedia Interface (HDMI) (registered trademark). In addition, the input IF 1070 is an interface for receiving information from various input devices 1020 such as a mouse, a keyboard, and a scanner, and is implemented by, for example, USB or the like.

Alternatively, the input device 1020 may be, for example, a device that reads information from an optical recording medium such as a compact disc (CD), a digital versatile disc (DVD), or a phase change rewritable disk (PD), a magneto-optical recording medium such as a magneto-optical disk (MO), a tape medium, a magnetic recording medium, a semiconductor memory, or the like. The input device 1020 may also be an external storage medium such as a USB memory.

The network IF 1080 receives data from another device via a network N and transmits the data to the arithmetic device 1030, and transmits data generated by the arithmetic device 1030 to another device via the network N.

The arithmetic device 1030 controls the output device 1010 and the input device 1020 via the output IF 1060 and the input IF 1070. For example, the arithmetic device 1030 loads a program from the input device 1020 or the secondary storage device 1050 onto the primary storage device 1040, and executes the loaded program.

For example, in a case where the computer 1000 functions as the FIDO server 1, the arithmetic device 1030 of the computer 1000 realizes the functions of the control unit 3 by executing programs loaded onto the primary storage device 1040.

Effects

As described above, the information processing device (FIDO server 1) according to the embodiment includes the control unit 3. The control unit 3 acquires, from the authentication server 10, the generation request of the key pair for FIDO authentication transmitted from the user terminal 30 including the authenticator for FIDO authentication to the authentication server 10, generates the generation instruction for causing the authenticator to generate the key pair based on the generation request, and notifies the authenticator of the generation instruction via the authentication server 10. The control unit 3 acquires, via the authentication server 10, the public key of the key pair generated by the authenticator according to the generation instruction, stores the acquired public key in association with the link ID, and notifies the authentication server 10 of the link ID. The control unit 3, when acquiring the public key, acquires the attestation information of the authenticator via the authentication server 10, generates the authentication registration context indicating whether or not to register the user based on the verification result of the attestation information, and notifies the authentication server 10 of the authentication registration context. The control unit 3 acquires the authentication request, together with the link ID corresponding to the target user, via the authentication server 10 from the service providing server 20 to which the access is requested from the user terminal 30, generates the acquisition instruction of the authentication information corresponding to the link ID, and notifies the authenticator of the acquisition instruction via the authentication server 10. The control unit 3 acquires, via the authentication server 10, the assertion information in which the authentication information acquired by the authenticator according to the acquisition instruction has been signed using the private key, generates the authentication result context indicating whether or not to authenticate the user based on the verification result of the assertion information, and notifies the authentication server 10 of the authentication result context. The control unit 3 acquires the additional information related to the user together with the assertion information, and generates the authentication result context indicating whether or not to authenticate the user based on the verification result of the assertion information and the additional information. The additional information includes at least the position information of the user. With such a configuration, it is possible to easily introduce the FIDO-based authentication technique.

As described above, the information processing device (FIDO server 1) according to the embodiment includes the control unit 3. The control unit 3 acquires, from the service providing server 20, the generation request of the key pair for FIDO authentication transmitted from the user terminal 30 including the authenticator for FIDO authentication to the service providing server 20 via the authentication server 10, generates the generation instruction for causing the authenticator to generate the key pair based on the generation request, and notifies the authenticator of the generation instruction via the service providing server 20. The control unit 3 acquires, via the service providing server 20, the public key of the key pair generated by the authenticator according to the generation instruction, stores the acquired public key in association with the link ID, and notifies the authentication server 10 of the link ID via the service providing server 20. The control unit 3, when acquiring the public key, acquires the attestation information of the authenticator via the service providing server 20, generates the authentication registration context indicating whether or not to register the user based on the verification result of the attestation information, and notifies the authentication server 10 of the authentication registration context via the service providing server 20. The control unit 3, when the user terminal 30 requests the access to the service providing server 20, acquires the authentication request, together with the link ID corresponding to the target user, from the service providing server 20 via the authentication server 10, generates the acquisition instruction of the authentication information corresponding to the link ID, and notifies the authenticator of the acquisition instruction via the service providing server 20. The control unit 3 acquires, via the service providing server 20, the assertion information in which the authentication information acquired by the authenticator according to the acquisition instruction has been signed using the private key, generates the authentication result context indicating whether or not to authenticate the user based on the verification result of the assertion information, and notifies the authentication server 10 of the authentication result context via the service providing server 20. The control unit 3 acquires the additional information related to the user together with the assertion information, and generates the authentication result context indicating whether or not to authenticate the user based on the verification result of the assertion information and the additional information. The additional information includes at least the position information of the user. With such a configuration, it is possible to easily introduce the FIDO-based authentication technique.

Although some of the embodiments of the present application have been described in detail with reference to the drawings, these are merely examples, and the present invention may be implemented in other forms subjected to various modifications and improvements based on the knowledge of those skilled in the art, including the aspects described in the disclosure of the invention.

Others

In addition, among the processing described in the above embodiment, all or some of the processing described as being automatically performed may be manually performed; alternatively, all or some of the processing described as being manually performed may be automatically performed by a known method. Furthermore, the processing procedures, specific names, and information including various data and parameters illustrated in the above document and drawings may be arbitrarily changed unless otherwise specified. For example, the various information illustrated in the drawings is not limited to the illustrated information.

In addition, the components of the devices illustrated in the drawings are functionally conceptual, and need not necessarily be physically configured as illustrated in the drawings. That is, specific forms of distribution and integration of the devices are not limited to the forms illustrated in the drawings, and all or some of the devices may be functionally or physically distributed and integrated in arbitrary units according to various loads, usage conditions, and the like.

In addition, the processing described in the above embodiment may be appropriately combined with each other such that the processing contents do not contradict.

In addition, the "part (section, module, or unit)" described above may be read as "means", "circuit", or the like. For example, the control unit 3 can be replaced with a control means or a control circuit.

According to one aspect of the embodiment, the effect is that it is possible to easily introduce the FIDO-based authentication technique.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device comprising:
a processor configured to:
acquire, from an authentication server, a generation request of a key pair for FIDO authentication transmitted from a user terminal including an authenticator for the FIDO authentication to the authentication server, generate a generation instruction for causing the authenticator to generate the key pair based on the generation request, and notify the authenticator of the generation instruction via the authentication server;
acquire, via the authentication server, a public key of the key pair generated by the authenticator according to the generation instruction, store the acquired public key in association with a link ID, and notifies the authentication server of the link ID;
when acquiring the public key, acquire attestation information of the authenticator via the authentication server, generate an authentication registration context indicating whether or not to register a user based on a verification result of the attestation information, and notify the authentication server of the authentication registration context; and
acquire an authentication request, together with the link ID corresponding to a target user, via the authentication server from a service providing server to which an access is requested from the user terminal, generate an acquisition instruction of authentication information corresponding to the link ID, and notify the authenticator of the acquisition instruction via the authentication server.

2. The information processing device according to claim 1, wherein the processor is further configured to acquire, via the authentication server, assertion information in which the authentication information acquired by the authenticator according to the acquisition instruction has been signed using a private key, generate an authentication result context indicating whether or not to authenticate the user based on a verification result of the assertion information, and notify the authentication server of the authentication result context.

3. The information processing device according to claim 2, wherein the processor is further configured to acquire additional information related to the user together with the assertion information, and generate an authentication result context indicating whether or not to authenticate the user based on a verification result of the assertion information and the additional information.

4. The information processing device according to claim 3, wherein the additional information includes at least position information of the user.

5. An information processing method executed by a computer, the method comprising:
acquiring, from an authentication server, a generation request of a key pair for FIDO authentication transmitted from a user terminal including an authenticator for the FIDO authentication to the authentication server, generating a generation instruction for causing the authenticator to generate the key pair based on the generation request, and notifying the authenticator of the generation instruction via the authentication server;

acquiring, via the authentication server, a public key of the key pair generated by the authenticator according to the generation instruction, storing the acquired public key in association with a link ID, and notifies the authentication server of the link ID;

when acquiring the public key, acquiring attestation information of the authenticator via the authentication server, generating an authentication registration context indicating whether or not to register a user based on a verification result of the attestation information, and notifying the authentication server of the authentication registration context; and acquiring an authentication request, together with the link ID corresponding to a target user, via the authentication server from a service providing server to which an access is requested from the user terminal, generating an acquisition instruction of authentication information corresponding to the link ID, and notifying the authenticator of the acquisition instruction via the authentication server.

6. A non-transitory computer readable storage medium storing an information processing program for causing a computer to execute:

acquiring, from an authentication server, a generation request of a key pair for FIDO authentication transmitted from a user terminal including an authenticator for the FIDO authentication to the authentication server, generating a generation instruction for causing the authenticator to generate the key pair based on the generation request, and notifying the authenticator of the generation instruction via the authentication server;

acquiring, via the authentication server, a public key of the key pair generated by the authenticator according to the generation instruction, storing the acquired public key in association with a link ID, and notifies the authentication server of the link ID;

when acquiring the public key, acquiring attestation information of the authenticator via the authentication server, generating an authentication registration context indicating whether or not to register a user based on a verification result of the attestation information, and notifying the authentication server of the authentication registration context; and acquiring an authentication request, together with the link ID corresponding to a target user, via the authentication server from a service providing server to which an access is requested from the user terminal, generating an acquisition instruction of authentication information corresponding to the link ID, and notifying the authenticator of the acquisition instruction via the authentication server.

* * * * *